United States Patent
Muta et al.

(10) Patent No.: US 7,762,921 B2
(45) Date of Patent: Jul. 27, 2010

(54) POWERTRAIN AND METHOD OF CONTROLLING POWERTRAIN

(75) Inventors: Koichiro Muta, Okazaki (JP); Tomokazu Nomura, Anjo (JP)

(73) Assignees: Toyota Jidosha Kabushiki Kaisha, Toyota (JP); Aisin AW Co., Ltd., Anjo-Shi (JP)

( * ) Notice: Subject to any disclaimer, the term of this patent is extended or adjusted under 35 U.S.C. 154(b) by 476 days.

(21) Appl. No.: 11/902,883

(22) Filed: Sep. 26, 2007

(65) Prior Publication Data

US 2008/0146405 A1 Jun. 19, 2008

(30) Foreign Application Priority Data

Dec. 18, 2006 (JP) ............................. 2006-339784

(51) Int. Cl.
*B60K 1/02* (2006.01)
*F16H 3/72* (2006.01)

(52) U.S. Cl. .............................................. 477/3; 475/5

(58) Field of Classification Search ...................... 477/3, 477/4; 475/2, 5

See application file for complete search history.

(56) References Cited

U.S. PATENT DOCUMENTS

| 7,534,190 B2 * | 5/2009 | Tabata et al. .................... 477/3 |
| 7,566,288 B2 * | 7/2009 | Tabata et al. .................... 477/4 |
| 7,601,093 B2 * | 10/2009 | Tabata et al. .................... 477/5 |
| 2008/0318727 A1 * | 12/2008 | Matsubara et al. ............. 477/3 |
| 2009/0023547 A1 * | 1/2009 | Matsubara et al. ............. 477/3 |

FOREIGN PATENT DOCUMENTS

JP    A 2005-337491    12/2005

* cited by examiner

*Primary Examiner*—Roger Pang
(74) *Attorney, Agent, or Firm*—Oliff & Berridge, PLC (57) ABSTRACT

An ECU executes a program including the steps of: providing control over an engine coupled to a carrier for driving a first MG coupled to a sun gear in a power split device, and providing control over a second MG for allowing a ring gear to stop; expecting that a shift operation will be performed when a brake operation is performed; and stopping providing the control over the engine for driving the first MG and stopping providing the control over the second MG for allowing the ring gear to stop.

9 Claims, 9 Drawing Sheets

|  | C0 | C1 | C2 | B0 | B1 | B2 | B3 |
|---|---|---|---|---|---|---|---|
| 1ST | ◎ | ○ | × | × | × | × | ○ |
| 2ND | ◎ | ○ | × | × | × | ○ | × |
| 3RD | ◎ | ○ | × | × | ○ | × | × |
| 4TH | ◎ | ○ | ○ | × | × | × | × |
| 5TH | × | ○ | ○ | ◎ | × | × | × |
| R | × | × | ○ | × | × | × | ○ |
| N | × | × | × | × | × | × | × |
| P | × | × | × | × | × | × | × |

○ ENGAGED
× DISENGAGED
◎ ENGAGED IN STEPWISE SHIFT STATE
　DISENGAGED IN CONTINUOUS SHIFT STATE

| | C0 | C1 | C2 | B0 | B2 | B3 |
|---|---|---|---|---|---|---|
| 1ST | ◎ | ○ | × | × | × | ○ |
| 2ND | ◎ | ○ | × | × | ○ | × |
| 3RD | ◎ | ○ | ○ | × | × | × |
| 4TH | × | ○ | ○ | ◎ | × | × |
| R | × | × | ○ | × | × | ○ |
| N | × | × | × | × | × | × |
| P | × | × | × | × | × | × |

○ ENGAGED
× DISENGAGED
◎ ENGAGED IN STEPWISE SHIFT STATE
   DISENGAGED IN CONTINUOUS SHIFT STATE

FIG. 10

POWERTRAIN AND METHOD OF CONTROLLING POWERTRAIN

This nonprovisional application is based on Japanese Patent Application No. 2006-339784 filed with the Japan Patent Office on Dec. 18, 2006, the entire contents of which are hereby incorporated by reference.

BACKGROUND OF THE INVENTION

1. Field of the Invention

The present invention relates to a powertrain and a method of controlling a powertrain, and in particular, to a technique of controlling a powertrain having an engine and a rotating electric machine as motive power sources.

2. Description of the Background Art

Conventionally, a hybrid vehicle having an internal combustion engine and a rotating electric machine as motive power sources is known. In such a hybrid vehicle, the internal combustion engine and the rotating electric machine are selectively used in accordance with a traveling state of the vehicle. For example, the internal combustion engine is mainly used for traveling at a high speed, and the rotating electric machine is mainly used for traveling at an intermediate or low speed. One such hybrid vehicle is provided with a differential mechanism that functions as a continuously variable transmission by means of a rotating electric machine.

Japanese Patent Laying-Open No. 2005-337491 discloses a control apparatus for a vehicular drive apparatus. The control apparatus includes: a continuous shift portion that has a differential mechanism constituted of a first element coupled to an engine, a second element coupled to a first motor (rotating electric machine), and a third element coupled to a second motor, and that functions as an electric continuously variable transmission; and a shift portion (shift mechanism) provided between the continuous shift portion and wheels. The control apparatus of Japanese Patent Laying-Open No. 2005-337491 includes a continuous shift control portion that executes, when the shift portion is shifted, shift of the continuous shift portion synchronizing with the shift of the shift portion so that the gear ratio implemented by the continuous shift portion and the shift portion is continuous.

According to the control apparatus disclosed in the publication, the gear ratio implemented by the continuous shift portion and the shift portion, i.e., a synthesis gear ratio implemented based on the gear ratio of the continuous shift portion and that of the shift portion is continuously changed. Thus, the engine speed (revolution speed) is changed continuously before and after the shift of the shift portion, whereby a shift shock is reduced.

Meanwhile, in a hybrid vehicle having a powertrain provided with two rotating electric machines such as the vehicular drive apparatus disclosed in Japanese Patent Laying-Open No. 2005-337491, for example when the shift lever is in P (parking) position, one of the rotating electric machines may be driven by the engine to generate power. In such a situation, in the vehicle provided with a stepwise transmission between a continuous shift portion, wherein an engine and two rotating electric machines are coupled via a differential mechanism, and wheels, such as the one disclosed in Japanese Patent Laying-Open No. 2005-337491, when the stepwise transmission in P (parking) range or the like is shifted to the neutral state, in order for the driving force of the engine to efficiently be transmitted to the rotating electric machine employed as a generator, it is desirable that a rotary element coupled to the rotating electric machine that does not generate power is stopped. Accordingly, when power is generated by one of the rotating electric machines, control is provided over the other rotating electric machine for allowing the rotary element coupled to the other rotating electric machine to stop. However, when control over the rotating electric machine for allowing the rotary element to stop is provided, if the vehicle is to be started, torque of the rotating electric machine must once be "0" so that transition to control for allowing the rotating electric machine to actuate as the drive source of the vehicle is realized. Here, since the rotary element having been stopped becomes freely rotatable, the load to the engine is abruptly reduced and the engine speed may abruptly be increased.

SUMMARY OF THE INVENTION

An object of the present invention is to provide a powertrain and the like that is capable of preventing an abrupt increase in the engine speed.

A powertrain according to one aspect of the present invention includes: a differential mechanism having a first rotary element coupled to a first rotating electric machine, a second rotary element coupled to a second rotating electric machine, and a third rotary element coupled to an engine; a shift mechanism coupled to the second rotary element and transmitting torque being input from the second rotary element to a wheel; and an operation unit. The operation unit provides control, over the engine, for driving the first rotating electric machine, and provides control, over the second rotating electric machine, for allowing the second rotary element to stop. The operation unit expects a shift operation of a driver. The operation unit stops providing the control over the engine for driving the first rotating electric machine and stops providing the control over the second rotating electric machine for allowing the second rotary element to stop, when the shift operation is expected.

According to this configuration, for example when power is generated by the first rotating electric machine, control is provided, over the engine, for driving the first rotating electric machine, and control is provided, over the second rotating electric machine, for allowing the second rotary element to stop. Thus, reaction force can be received by the second rotary element and driving force output from the engine can efficiently be transmitted to the first rotating electric machine. Provision of the control over the engine for driving the first rotating electric machine is stopped and provision of the control over the second rotating electric machine for allowing the second rotary element to stop is stopped, when the shift operation is expected. Thus, provision of the control over the engine for driving the first rotating electric machine can be stopped and provision of the control over the second rotating electric machine for allowing the second rotary element to stop can be stopped, before the shift operation is actually performed. Thus, transition to control for reducing the output of the engine and for actuating in advance the rotating electric machine as the drive source of the vehicle can be made. As a result, a powertrain that is capable of preventing an abrupt increase in the engine speed can be provided.

Preferably, the operation unit expects the shift operation when a brake operation by the driver is performed.

According to this configuration, for example when the shift lever is shifted from P (parking) position to another position, a brake operation is performed. Therefore, when a brake operation is performed by the driver, a shift operation is expected. Thus, a shift operation can surely be expected.

Further preferably, the operation unit provides the control over the engine for driving the first rotating electric machine and provides the control over the second rotating electric machine for allowing the second rotary element to stop, when power is generated by the first rotating electric machine.

According to this configuration, when power is generated by the first rotating electric machine, control is provided over the engine for driving the first rotating electric machine, and control is provided over the second rotating electric machine for allowing the second rotary element to stop. Thus, when power is generated by the first rotating electric machine, driving force output from the engine can efficiently be transmitted to the first rotating electric machine. Therefore, power generation efficiency can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, referring to the drawings, an embodiment of the present invention will be described. In the following description, identical components are denoted by identical reference characters. Their labels and functions are also identical. Accordingly, detailed description thereof will not be repeated.

Figure 1:
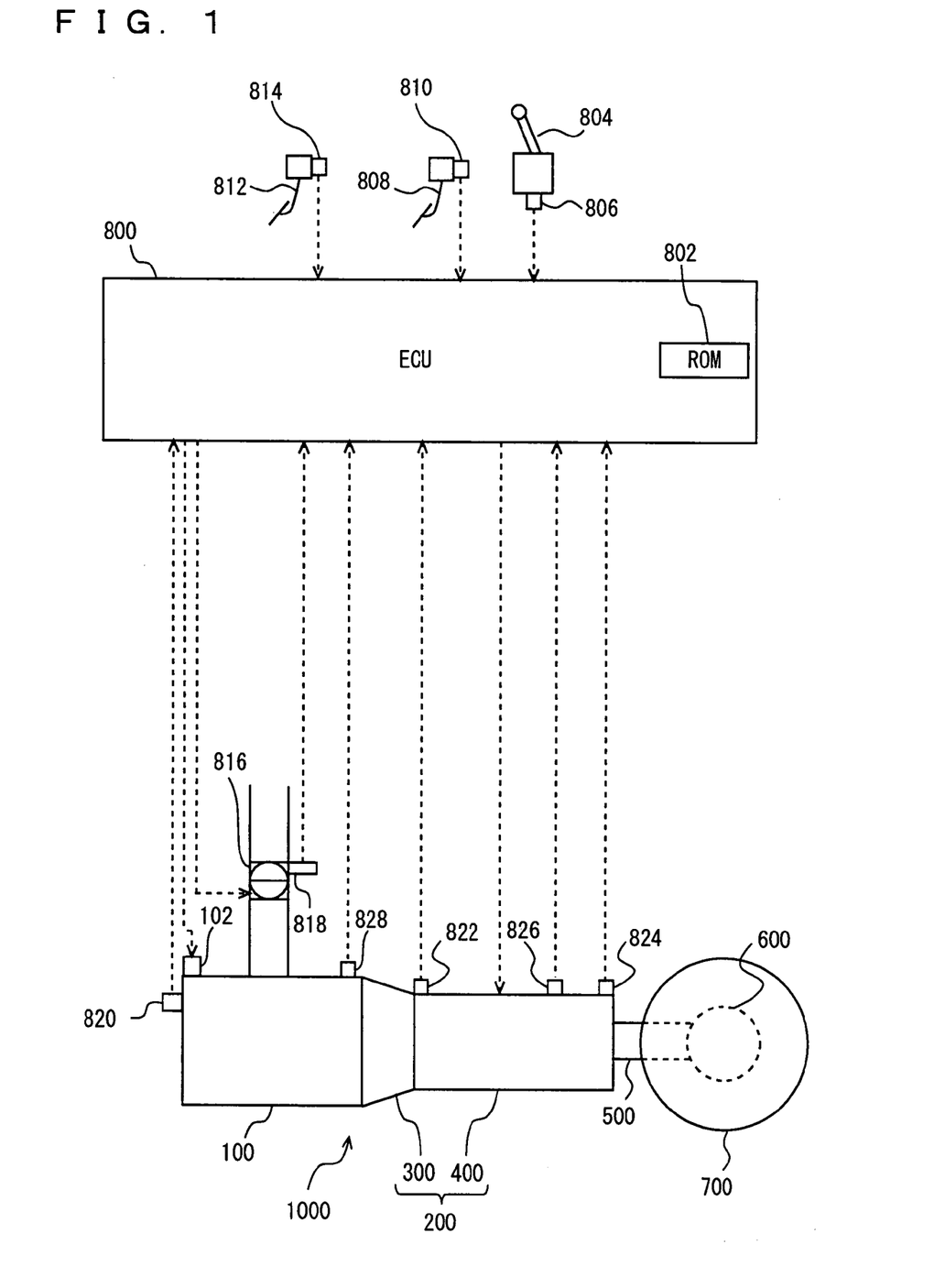
FIG. 1 is a schematic configuration diagram showing a hybrid vehicle incorporating a control apparatus according to an embodiment of the present invention.

Referring to FIG. 1, a hybrid vehicle incorporating a control apparatus according to the present embodiment will be described. The hybrid vehicle is an FR (Front engine Rear drive) vehicle. It is noted that the vehicle may not necessarily be an FR vehicle.

The hybrid vehicle includes an engine 100, a transmission 200, a propeller shaft 500, a differential gear 600, rear wheels 700, and an ECU (Electronic Control Unit) 800. The control apparatus according to the present embodiment is implemented by, for example, the execution of a program recorded in ROM (Read Only Memory) 802 of ECU 800. A powertrain 1000 controlled by ECU 800 that is a control apparatus according to the embodiment of the present invention includes engine 100 and transmission 200.

Engine 100 is an internal combustion engine that burns an air-fuel mixture of fuel injected from an injector 102 and air, inside a combustion chamber of a cylinder. A piston in the cylinder is pushed down by the combustion, and a crankshaft is rotated.

Transmission 200 is coupled to engine 100. As described later, transmission 200 includes a first shift portion 300 and a second shift portion 400. Torque output from transmission 200 is transmitted to right and left rear wheels 700 via propeller shaft 500 and differential gear 600.

Connected to ECU 800 via a harness or the like are a position switch 806 of a shift lever 804, an accelerator pedal position sensor 810 of an accelerator pedal 808, a brake switch 814 of a brake pedal 812, a throttle position sensor 818 of an electronic throttle valve 816, an engine speed sensor 820, an input shaft rotation speed sensor 822, an output shaft rotation speed sensor 824, an oil temperature sensor 826, and a water temperature sensor 828.

The position of shift lever 804 is detected by position switch 806, and a signal representing the detection result is transmitted to ECU 800. Corresponding to the position of shift lever 804, shift in transmission 200 is achieved automatically.

Accelerator pedal position sensor 810 detects the position of accelerator pedal 808, and transmits a signal representing the detection result to ECU 800. Brake switch 814 detects a brake operation (an operation of brake pedal 812 by the driver), and transmits a signal representing the detection result to ECU 800.

Throttle position sensor 818 detects the position of electronic throttle valve 816 having its position adjusted by an actuator, and transmits a signal representing the detection result to ECU 800. The amount of air taken into engine 100 (an output of engine 100) is adjusted by electronic throttle valve 816.

It is noted that, instead of or in addition to electronic throttle valve 816, an intake valve (not shown) or an exhaust valve (not shown) may have its lift amount or opening/closing phase changed so that the amount of air taken into engine 100 is adjusted.

Engine speed sensor 820 detects the rotation speed of an output shaft (crankshaft) of engine 100, and transmits a signal representing the detection result to ECU 800. Input shaft rotation speed sensor 822 detects an input shaft rotation speed NI of second shift portion 400, and transmits a signal representing the detection result to ECU 800. Output shaft rotation speed sensor 824 detects an output shaft rotation speed NO of transmission 200 (second shift portion 400), and transmits a signal representing the detection result to ECU 800.

Oil temperature sensor 826 detects the temperature (oil temperature) of oil (Automatic Transmission Fluid, ATF) used for actuation or lubrication of transmission 200, and transmits a signal representing the detection result to ECU 800.

Water temperature sensor 828 detects the temperature (water temperature) of coolant of engine 100, and transmits a signal representing the detection result to ECU 800.

ECU 800 provides control over various devices such that the vehicle attains a desired traveling state based on signals transmitted from position switch 806, accelerator pedal position sensor 810, brake switch 814, throttle position sensor 818, engine speed sensor 820, input shaft rotation speed sensor 822, output shaft rotation speed sensor 824, oil temperature sensor 826, water temperature sensor 828 and the like, as well as map and program stored in ROM 802.

Figure 2:
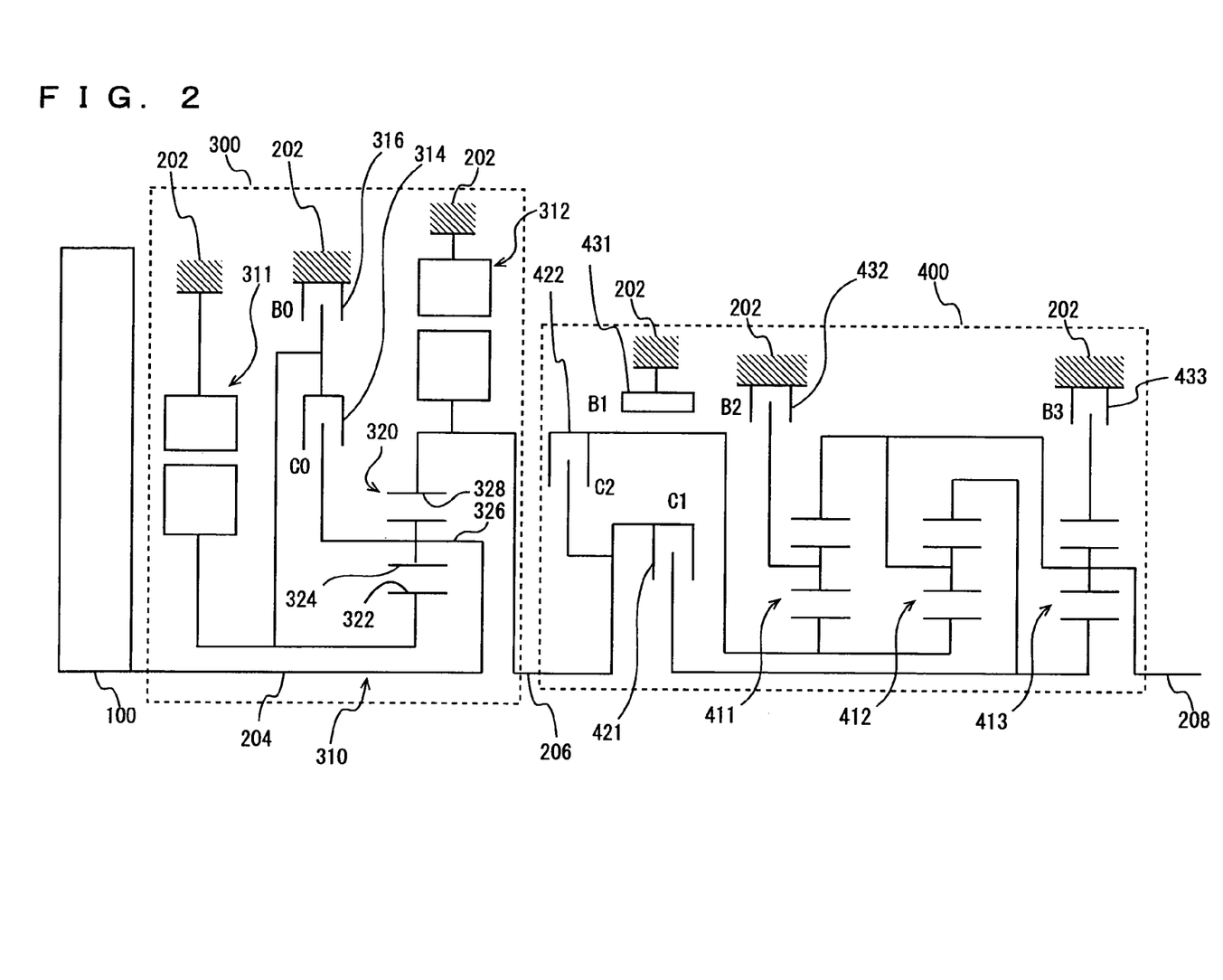
FIG. 2 is a diagram (No. 1) showing a transmission.

Referring to FIG. 2, transmission 200 is further described. Included in transmission 200 as coaxially arranged in a case 202 that is a non-rotary member are: an input shaft 204 being an input rotary member; a first shift portion 300 coupled directly or via a damper (not shown) to input shaft 204; a second shift portion 400 serially coupled in a power transmitting route between first shift portion 300 and rear wheels 700 via a transmission member (transmission shaft) 206; and an output shaft 208 being an output rotary member coupled to second shift portion 400.

Transmission 200 is configured symmetrically relative to its axis. Accordingly, the lower part of transmission 200 is omitted in FIG. 2.

First shift portion 300 includes a power split device 310, a first MG (Motor Generator) 311, and a second MG 312. First shift portion 300 further includes two frictional engagement elements of a C0 clutch 314 and a B0 brake 316.

Power split device 310 splits the output of engine 100 being input to input shaft 204 for first MG 311 and transmission member 206. Power split device 310 is constituted of a planetary gear 320.

Planetary gear 320 includes a sun gear 322, a pinion gear 324, a carrier 326 supporting pinion gear 324 so that it can rotate on its own axis and revolve around sun gear 322, and a ring gear 328 meshing with sun gear 322 via pinion gear 324.

In power split device 310, carrier 326 is coupled to input shaft 204, i.e., to engine 100. Sun gear 322 is coupled to first MG 311. Ring gear 328 is coupled to second MG 312 via transmission member 206.

Power split device 310 functions as a differential apparatus, by the relative rotation of sun gear 322, carrier 326, and ring gear 328. By the differential function of power split device 310, the output of engine 100 is divided for first MG 311 and for transmission member 206.

First MG 311 generates power using part of the divided output of engine 100, and/or second MG 312 rotates using the power generated by first MG 311, whereby power split device 310 functions as a continuously variable transmission.

First MG 311 and second MG 312 are three-phase alternating current rotating electric machines. First MG 311 is coupled to sun gear 322 of power split device 310. Second MG 312 is provided such that rotors integrally rotate with transmission member 206.

First MG 311 and second MG 312 are controlled so as to satisfy target output torque of transmission 200 that is calculated from, for example, the accelerator pedal position and the vehicle speed, and to realize the optimum fuel efficiency in engine 100.

C0 clutch 314 is provided so as to couple sun gear 322 and carrier 326. B0 brake 316 is provided so as to couple sun gear 322 to case 202.

Second shift portion 400 includes three single pinion type planetary gears 411-413 and five frictional engagement elements of a C1 clutch 421, a C2 clutch 422, a B1 brake 431, a B2 brake 432, and B3 brake 433.

Figure 3:
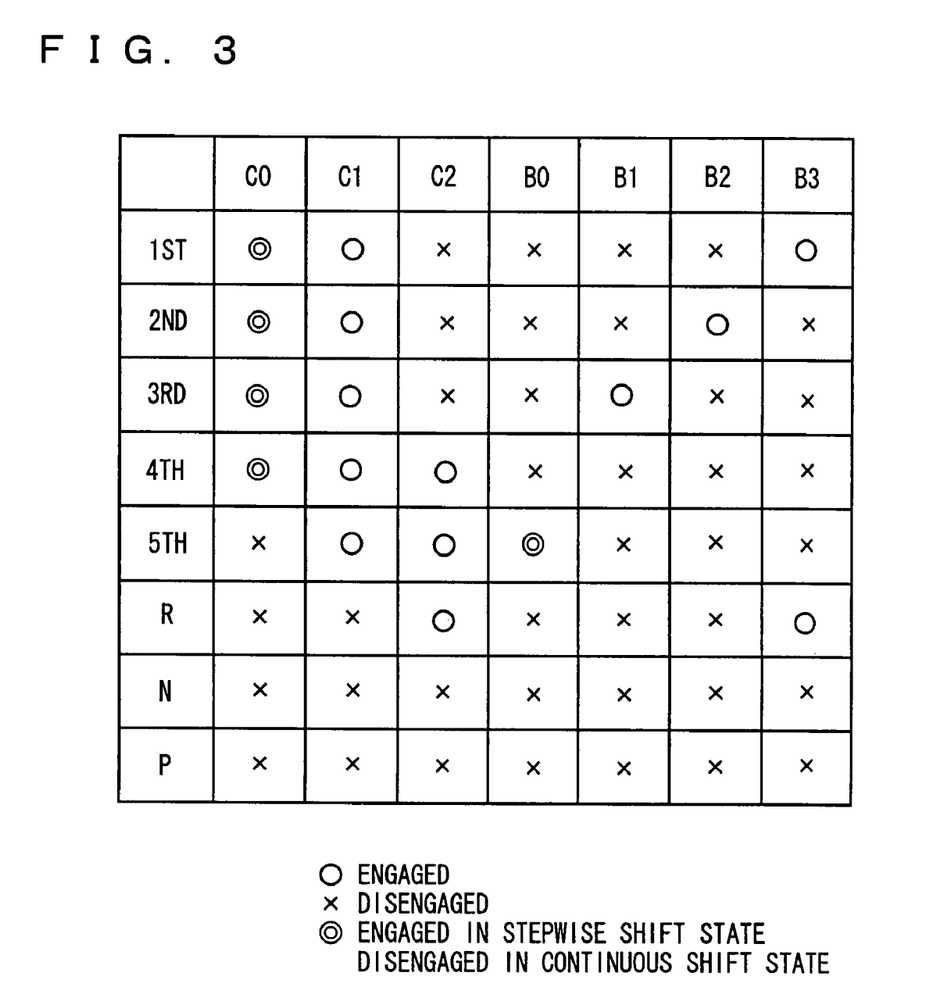
FIG. 3 is an operation table (No. 1).

By the engagement of the frictional engagement elements of first shift portion 300 and second shift portion 400 in the combinations shown in the operation table of FIG. 3, five forward gears of first to fifth gears are implemented in transmission 200.

When C0 clutch 314 and B0 brake 316 are in a disengaged state, the relative rotation of sun gear 322, carrier 326 and ring gear 328 is permitted. In this state, power split device 310 functions as a continuously variable transmission. That is, transmission 200 enters a continuous shift state.

When C0 clutch 314 is in an engaged state, the relative rotation of sun gear 322, carrier 326 and ring gear 328 is prohibited. In this state, power split device 310 does not function as a continuously variable transmission. That is, a stepwise shift state in which gear ratio changes stepwise in transmission 200 is established.

When B0 brake 316 is in an engaged state, sun gear 322 is fixed to case 202. In this state, power split device 310 does not function as a continuously variable transmission. That is, transmission 200 enters a stepwise shift state.

As shown in FIG. 3, when shift lever 804 is in P position and when it is in N (Neutral) position, all the frictional engagement elements are caused to enter a disengaged state. Accordingly, transmission 200 enters a state where it cannot transmit torque to wheels. In this state, ring gear 328 cannot receive the reaction force of the driving force being output from engine 100.

Figure 4:
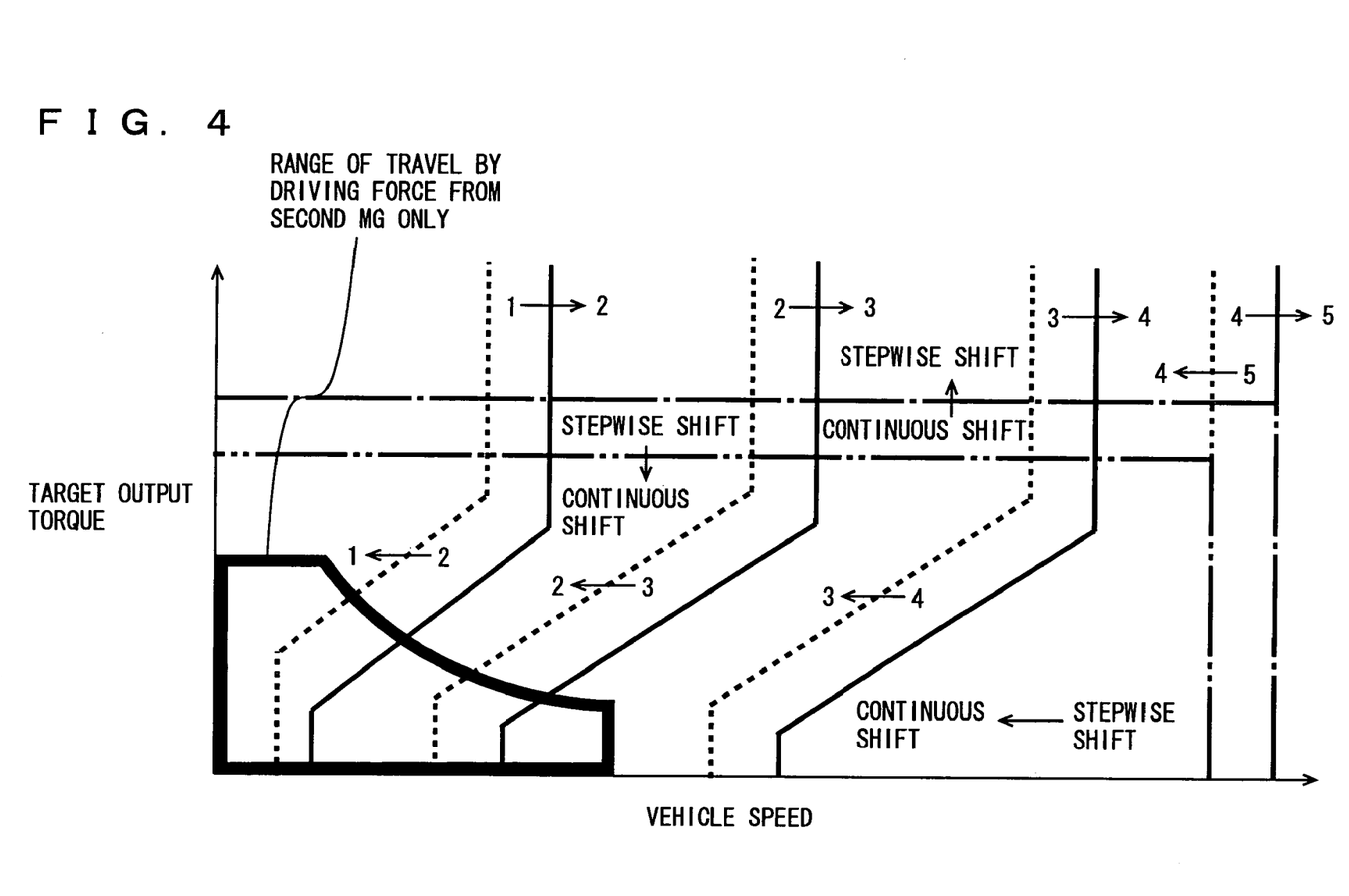
FIG. 4 is a shift map.

Shift (including switching between a continuous shift state and a stepwise shift state) in transmission 200 is controlled based on the shift map shown in FIG. 4, for example. The shift map in the present embodiment is determined with the parameters of target output torque calculated from accelerator pedal position and/or vehicle speed, and the vehicle speed. It is noted that parameters of a shift map are not limited thereto.

In FIG. 4, the solid line represents the up-shift line, and the dashed line represents the down-shift line. The range enclosed by the bold solid line in FIG. 4 represents a range where the vehicle travels using only the driving force of second MG 312 and without using the driving force of engine 100. The alternate long and short dash line in FIG. 4 is a switch line for switching from the continuous shift state to the stepwise shift state. The alternate long and two short dashes line is a switch line for switching from the stepwise shift state to the continuous shift state.

Figure 5:
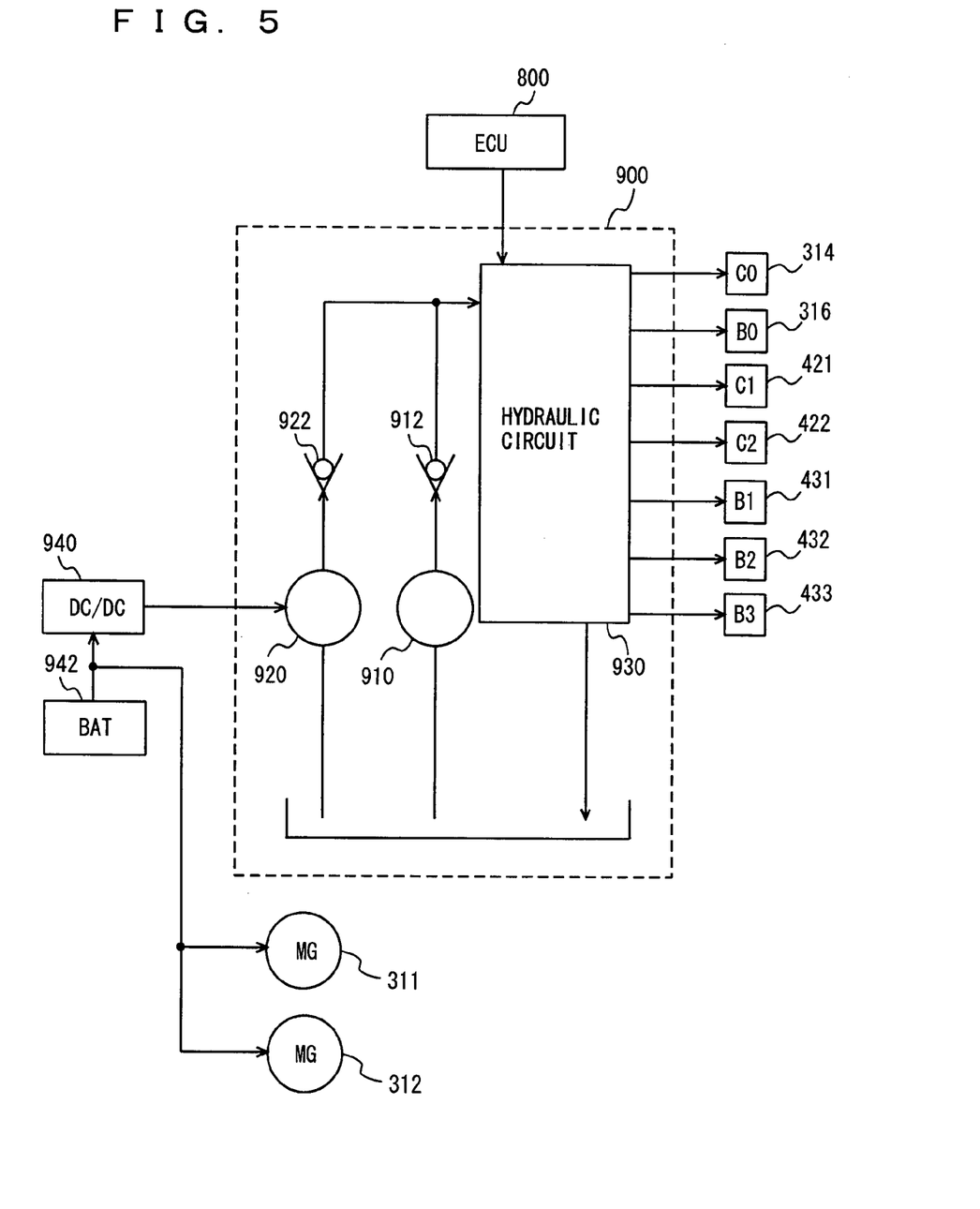
FIG. 5 shows a hydraulic control apparatus.

When shift is implemented, C0 clutch 314, B0 brake 316, C1 clutch 421, C2 clutch 422, B1 brake 431, B2 brake 432 and B3 brake 433 actuate by hydraulic pressure. In the present embodiment, as shown in FIG. 5, the hybrid vehicle is provided with a hydraulic control apparatus 900 feeding and exhausting hydraulic pressure to and from each frictional engagement element to control each element to engage and disengage.

Hydraulic control apparatus 900 includes a mechanical oil pump 910 and an electric motor driven oil pump 920, and a hydraulic circuit 930 that adjusts hydraulic pressure generated at oil pumps 910 and 920 to be a line pressure and also uses the line pressure as an initial pressure to provide an adjusted hydraulic pressure and feed and exhaust the adjusted hydraulic pressure to and from each frictional engagement element, and also supplies an appropriate portion with oil for lubrication.

Mechanical oil pump 910 is a pump driven by engine 100 to generate hydraulic pressure. Mechanical oil pump 910 is for example arranged coaxially with carrier 326, and receives torque from engine 100 to operate. That is, rotation of carrier 326 drives mechanical oil pump 910 and hydraulic pressure is generated.

In contrast, electric motor driven oil pump 920 is a pump driven by a motor (not shown). Electric motor driven oil pump 920 is attached at an appropriate location such as an exterior of a case 202. Electric motor driven oil pump 920 is controlled by ECU 800 to generate hydraulic pressure as desired. For example, the rotation speed or the like of electric motor driven oil pump 920 is feedback-controlled.

Electric motor driven oil pump 920 is actuated by electric power supplied from a battery 942 via a DC/DC converter 940. The electric power of battery 942 is supplied to first MG 311 and second MG 312 besides electric motor driven oil pump 920.

Hydraulic circuit 930 includes a plurality of solenoid valves, switching valves or pressure adjustment valves (all not shown) and is configured to be capable of electrically controlling pressure adjustment, and hydraulic pressure to be fed and exhausted. It is controlled by ECU 800.

Note that oil pumps 910 and 920 are provided at their respective discharging sides with check valves 912 and 922, which are opened by pressures respectively caused as oil pumps 910 and 920 discharge, and are closed for a direction opposite to that of the pressures. Oil pumps 910 and 920 are connected parallel to each other relative to hydraulic circuit 930. Furthermore a valve (not shown) that adjusts line pressure is configured to control the line pressure to have two states. More specifically, it increases an amount discharged and thus provides increased line pressure and, in contrast, decreases an amount discharged and thus provides decreased line pressure.

Figure 6:
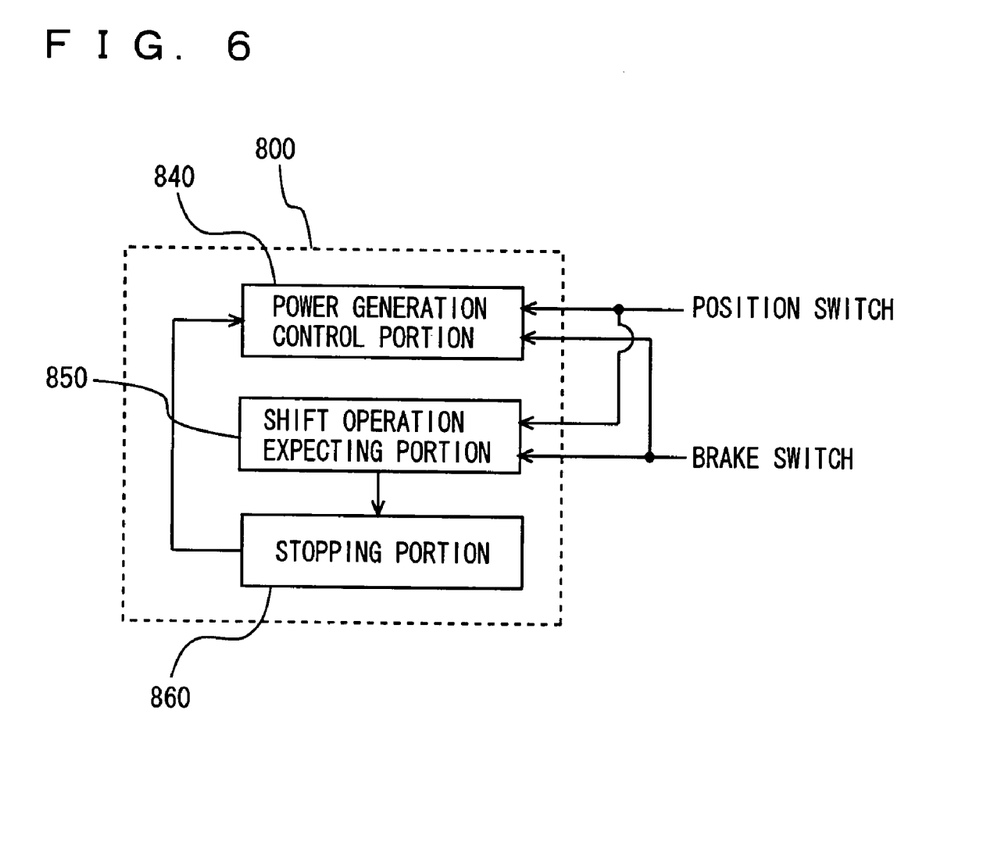
FIG. 6 is a functional block diagram of an ECU.

Referring to FIG. 6, the function of ECU 800 that is a control apparatus according to the present embodiment will be described. It is noted that the function of ECU 800 described below may be implemented by hardware or software.

ECU 800 includes a power generation control portion 840, a shift operation expecting portion 850, and a stopping portion 860. While the shift range is P range, if power is generated by means of first MG 311, power generation control portion 840 provides control over engine 100 for driving first MG 311 and provides control over second MG 312 for allowing ring gear 328 in power split device 310 to stop. For example, by supplying power only to d axis of second MG 312, control is provided over second MG 312 for allowing ring gear 328 in power split device 310 to stop.

Shift operation expecting portion 850 expects that, when there is a brake operation by the driver, a shift operation will be performed. When a shift operation is expected, stopping portion 860 stops the control over engine 100 for driving first MG 311 and also stops the control over second MG 312 for allowing ring gear 328 to stop.

Figure 7:
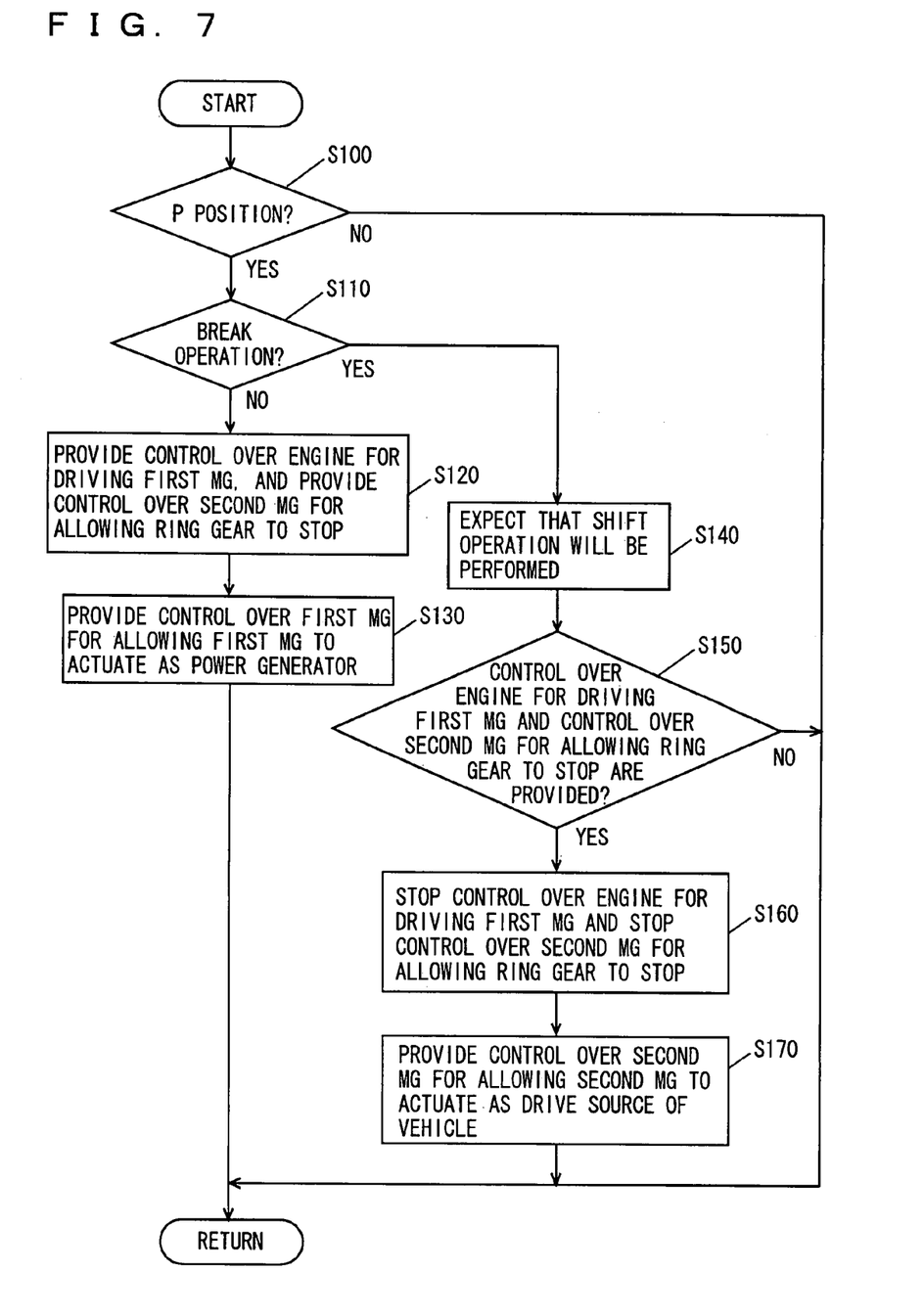
FIG. 7 is a flowchart showing a control structure of a program executed by the ECU.

Referring to FIG. 7, a control structure of a program executed by ECU 800 that is a control apparatus according to the present embodiment will be described. It is noted that the program described in the following is repeatedly executed in predetermined cycles.

In step (hereinafter step is abbreviated as S) 100, ECU 800 determines whether or not shift lever 804 is in P position, based on a signal transmitted from position switch 806. If shift lever 804 is in P position (YES in S100), the process goes to S110. Otherwise (NO in S100), this process ends.

In S110, ECU 800 determines whether or not a brake operation is performed, based on a signal transmitted from brake switch 814. If a brake operation is performed (YES in S110), the process goes to S140. Otherwise (NO in S110), the process goes to S120.

In S120, ECU 800 provides control over engine 100 for driving first MG 311, and provides control over second MG 312 for allowing ring gear 328 in power split device 310 to stop. In S130, ECU 800 provides control over first MG 311 for allowing first MG 311 to actuate as a power generator.

In S140, ECU 800 expects that a shift operation will be performed. In S150, ECU 800 determines whether or not it is a state where the control is provided over engine 100 for driving first MG 311 for power generation by first MG 311 and the control is provided over second MG 312 for allowing ring gear 328 to stop. If it is the state where the control is provided over engine 100 for driving first MG 311 and the control is provided over second MG 312 for allowing ring gear 328 to stop (YES in S150), the process goes to S160. Otherwise (NO in S150), the process ends.

In S160, ECU 800 stops providing the control over engine 100 for driving first MG 311, and also stops providing the control over second MG 312 for allowing ring gear 328 to stop.

In step S170, ECU 800 provides control over second MG 312 to actuate as a drive source of the vehicle. For example, by supplying power to d axis and q axis of second MG 312, control is provided over second MG 312 to actuate as a drive source of the vehicle.

A description will now be given of an operation of ECU 800 that is the control apparatus according to the present embodiment based on the above-described structure and flowchart.

During a vehicle system is activated, whether or not shift lever 804 is in P position is determined, based on a signal transmitted from position switch 806. When shift lever 804 is in P position (YES in S100), if the state of charge of battery 942 is low, it is necessary to charge battery 942 by actuating first MG 311 as a generator.

In order for first MG 311 to be actuated as a generator, first MG 311 must be driven by means of the driving force of engine 100. On the other hand, as described above, when shift lever 804 is in P position, all the frictional engagement elements are in a disengaged state. Thus, the reaction force of the driving force output from engine 100 cannot be received by ring gear 328 of power split device 310.

Accordingly, when a brake operation is not performed (NO in S110), control is provided over engine 100 for driving first MG 311, and also control is provided over second MG 312 for allowing ring gear 328 to stop (S120). In this state, control is provided over first MG 311 for allowing first MG 311 to actuate as a generator (S130).

Thus, the reaction force can be received by ring gear 328 and the driving force output from engine 100 can efficiently be transmitted to first MG 311. Accordingly, the power generation efficiency of first MG 311 can be improved.

Meanwhile, when shift lever 804 is shifted from P position to, for example D (Drive) position or R (Reverse) position and the vehicle is started, control for allowing second MG 312 to actuate as a drive source must be entered.

However, in order for the control for allowing second MG 312 to actuate as a drive source to be entered from the state where the control is provided over second MG 312 for allowing ring gear 328 to stop, torque of second MG 312 once becomes "0". Here, ring gear 328 cannot receive the reaction force of the driving force output from engine 100, and the engine speed may abruptly be increased.

Therefore, based on that a brake operation will be performed if a shift operation in which shift lever 804 is shifted from P position to D position or to R position is performed, when a brake operation by the driver is performed (YES in S110), it is expected that a shift operation will be performed (S140).

Here, if it is a state where the control is provided over engine 100 for driving first MG 311 and the control is provided over second MG 312 for allowing ring gear 328 to stop (YES in S150), the control over engine 100 for driving first MG 311 and the control over second MG 312 for allowing ring gear 328 to stop are stopped (S160). Control is provided over second MG 312 to actuate as a drive source of the vehicle (S170).

Thus, before a shift operation is actually performed, transition from the control for stopping ring gear 328 by second MG 311 to the control for employing second MG 312 as a drive source of the vehicle can be realized, without increasing the engine speed. Thus, the engine speed is prevented from being abruptly increased when the vehicle is started where a shift operation is performed.

As above, according to the ECU that is the control apparatus according to the present embodiment, when the shift lever is in P position and a brake operation is not performed, control is provided over the engine for driving the first MG for power generation by first MG, and also control is provided over the second MG for allowing the ring gear to stop. Based on that a brake operation will be performed when a shift operation in which the shift lever is shifted from P position to, for example, D position or R position is performed, it is expected that, if a brake operation by the driver is performed, then a shift operation will be performed. If it is expected that a shift operation will be performed, then the control over the engine for driving the first MG and the control over the second MG for allowing the ring gear to stop are stopped. Thus, before a shift operation is actually performed, transition from the control for stopping the ring gear by the second MG to the control for employing the second MG as a drive source of the vehicle can be realized, without increasing the engine speed. Thus, the engine speed is prevented from being abruptly increased when the vehicle is started where a shift operation is performed.

Figure 8:
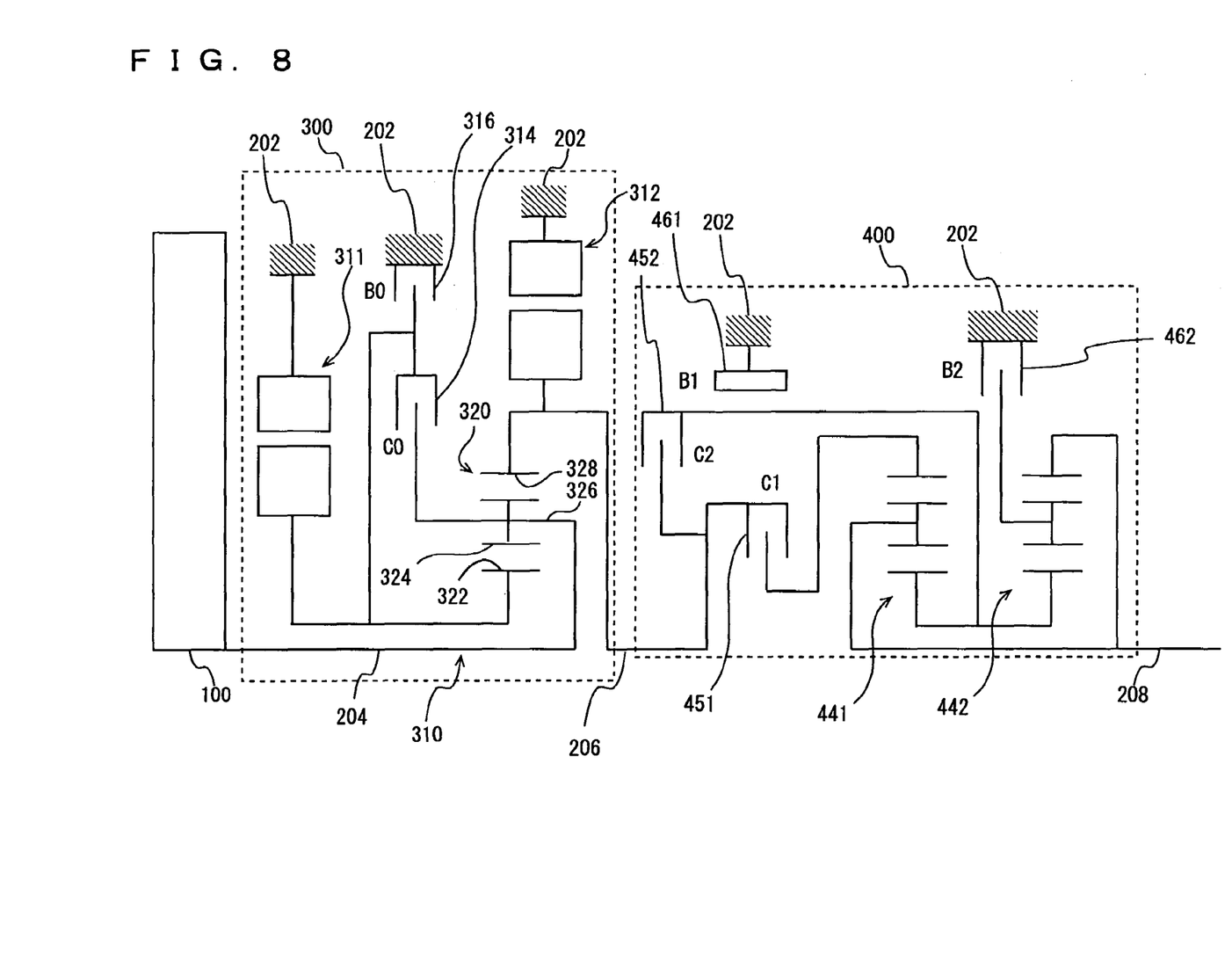
FIG. 8 is a diagram (No. 2) showing a transmission.
Figure 9:
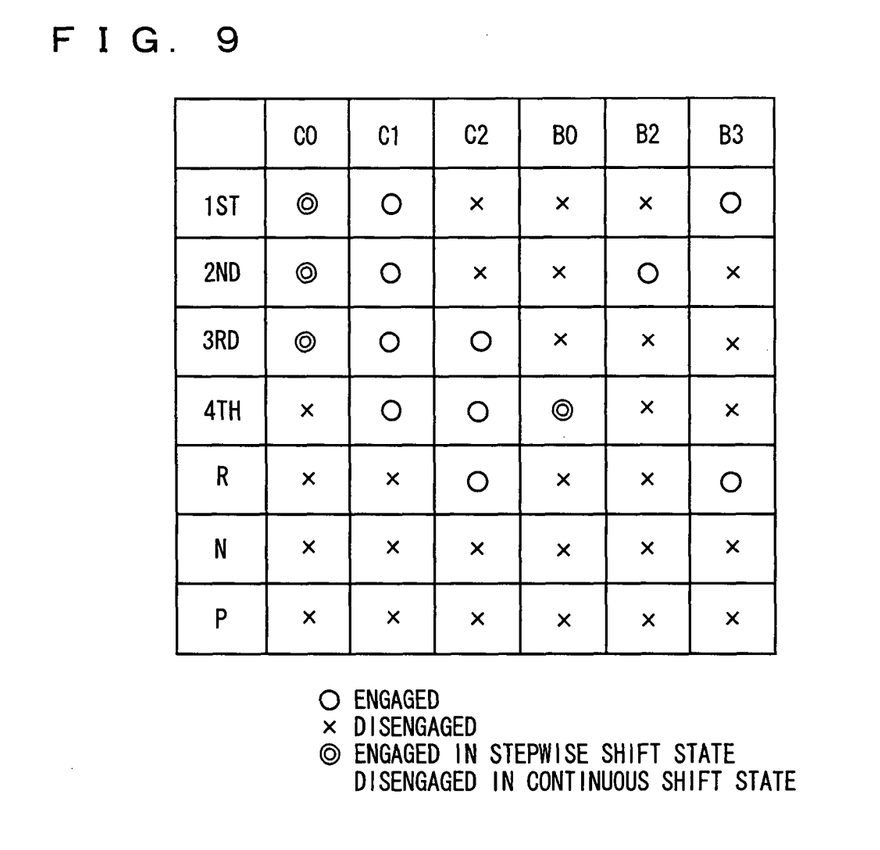
FIG. 9 is an operation table (No. 2).

It is noted that, instead of five forward gears, four forward gears of first to fourth gears may be allowed to be implemented in transmission 200. When transmission 200 is configured to be capable of implementing four forward gears, as shown in FIG. 8, second shift portion 400 includes two single pinion type planetary gears 441 and 442 and four frictional engagement elements of a C1 clutch 451, a C2 clutch 452, a B1 brake 461, and a B2 brake 462. By the engagement of the frictional engagement elements in the combinations shown in the operation table of FIG. 9, four forward gears of first to fourth gears are implemented.

Figure 10:
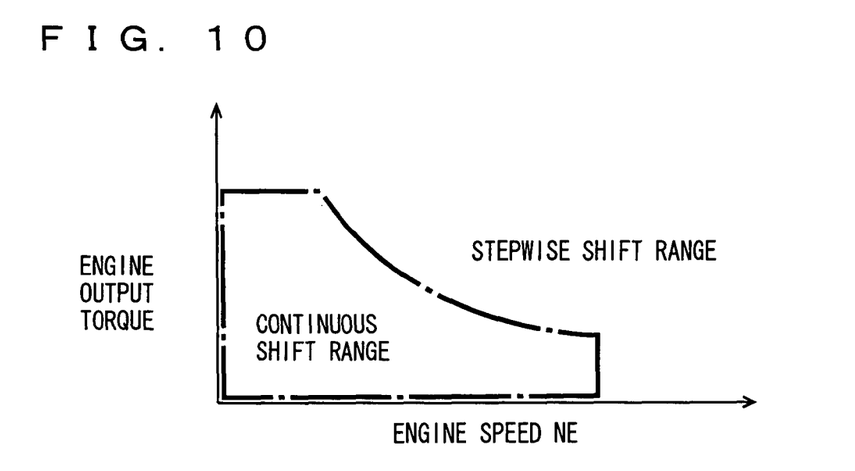
FIG. 10 shows a control range of a continuous shift state and a stepwise shift state.

It is noted that, instead of switching between the continuous shift state and the stepwise shift state based on a switching line defined in the shift map, it is also possible to switch between the continuous shift state and the stepwise shift state based on the map having output torque of engine 100 and engine speed NE as parameters, as shown in FIG. 10.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A powertrain, comprising:
   a differential mechanism having a first rotary element coupled to a first rotating electric machine, a second rotary element coupled to a second rotating electric machine, and a third rotary element coupled to an engine;
   a shift mechanism coupled to said second rotary element and transmitting torque being input from said second rotary element to a wheel; and
   an operation unit, wherein
   said operation unit provides control, over said engine, for driving said first rotating electric machine, and provides control, over said second rotating electric machine, for allowing said second rotary element to stop,
   said operation unit expects a shift operation of a driver, and
   said operation unit stops providing the control over said engine for driving said first rotating electric machine and stops providing the control over said second rotating electric machine for allowing said second rotary element to stop, when said shift operation is expected.

2. The powertrain according to claim 1, wherein
   said operation unit expects said shift operation when a brake operation by the driver is performed.

3. The powertrain according to claim 1, wherein
   said operation unit provides the control over said engine for driving said first rotating electric machine and provides the control over said second rotating electric machine for allowing said second rotary element to stop, when power is generated by said first rotating electric machine.

4. A powertrain, comprising:
   a differential mechanism having a first rotary element coupled to a first rotating electric machine, a second rotary element coupled to a second rotating electric machine, and a third rotary element coupled to an engine;
   a shift mechanism coupled to said second rotary element and transmitting torque being input from said second rotary element to a wheel;
   control means for providing control, over said engine, for driving said first rotating electric machine, and for providing control, over said second rotating electric machine, for allowing said second rotary element to stop;
   expecting means for expecting a shift operation of a driver; and
   means for stopping providing the control over said engine for driving said first rotating electric machine and for stopping providing the control over said second rotating electric machine for allowing said second rotary element to stop, when said shift operation of the driver is expected.

5. The powertrain according to claim 4, wherein
   said expecting means includes means for expecting said shift operation when a brake operation by the driver is performed.

6. The powertrain according to claim 4, wherein
   said control means includes means for providing the control over said engine for driving said first rotating electric machine and for providing the control over said second rotating electric machine for allowing said second rotary element to stop, when power is generated by said first rotating electric machine.

7. A method of controlling a powertrain provided with: a differential mechanism having a first rotary element coupled to a first rotating electric machine, a second rotary element coupled to a second rotating electric machine, and a third rotary element coupled to an engine; and a shift mechanism coupled to said second rotary element and transmitting torque being input from said second rotary element to a wheel, comprising the steps of:
   providing control, over said engine, for driving said first rotating electric machine, and providing control, over said second rotating electric machine, for allowing said second rotary element to stop;
   expecting a shift operation of a driver; and
   stopping providing the control over said engine for driving said first rotating electric machine and stopping providing the control over said second rotating electric machine for allowing said second rotary element to stop, when said shift operation is expected.

8. The method of controlling the powertrain according to claim 7, wherein
   said step of expecting the shift operation includes a step of expecting said shift operation when a brake operation is performed by the driver.

9. The method of controlling the powertrain according to claim 7, wherein
   said step of providing the control over said engine for driving said first rotating electric machine and providing the control over said second rotating electric machine for allowing said second rotary element to stop includes a step of providing the control over said engine for driving said first rotating electric machine and providing the control over said second rotating electric machine for allowing said second rotary element stops, when power is generated by said first rotating electric machine.

* * * * *